United States Patent

[11] 3,611,342

[72] Inventors Dirk Jan Raaben
Dieren;
Pieter J. Van Ek, Arnhem, both of Netherlands
[21] Appl. No. 832,744
[22] Filed June 12, 1969
[45] Patented Oct. 5, 1971
[73] Assignee American Enka Corporation
Enka, N.C.
[32] Priority June 15, 1968
[33] Netherlands
[31] 68-08471

[54] METHOD AND APPARATUS FOR DETECTING TRANSPORT DISTURBANCES IN A CONTINUOUS MATERIAL
8 Claims, 10 Drawing Figs.

[52] U.S. Cl. .................................................. 340/259, 66/163
[51] Int. Cl. ..................................................... G08b 21/00
[50] Field of Search ........................................... 340/259, 191; 87/19; 66/163, 159

[56] References Cited
UNITED STATES PATENTS
3,440,634 4/1969 Maurmann et al ............ 340/259

*Primary Examiner*—John W. Caldwell
*Assistant Examiner*—Michael Slobasky
*Attorney*—Francis W. Young

ABSTRACT: A method for detecting transport disturbances in a moving continuous material which comprises contacting a moving continuous material, e.g., a thread, with a vibration pickup means, producing a varying output signal with the pickup means during movement of the material, examining the varying output signal for the magnitude of the variations occurring therein and detecting the presence of a disturbance in the transport of the continuous material from the magnitude of the variations. Also an apparatus for carrying out this method is disclosed.

PATENTED OCT 5 1971  3,611,342

INVENTORS
DIRK JAN RAABEN &
PIETER JAN VAN EK

BY Francis W. Young
ATTORNEY

METHOD AND APPARATUS FOR DETECTING TRANSPORT DISTURBANCES IN A CONTINUOUS MATERIAL

This invention relates to a method and an apparatus for detecting disturbances in the transporting of a continuous threadlike material, more particularly a thread, yarn, cord, ribbon or the like.

For the purpose of checking whether the transporting or movement of continuous threadlike material proceeds in an uninterrupted manner, various detection methods have been developed. These methods have for their object to make it possible immediately to detect disturbances such as breakage of the continuous material. According to one known method, breakage of a travelling thread is detected with the aid of a stop motion which is kept in a predetermined position by the thread so long as the thread is intact, and is allowed to leave this position when the thread breaks. Then the stop motion switches off the transport mechanism.

A different known method for detecting breakage of a travelling yarn is to pass a yarn over a sensing element which forms part of an electrically actuated vibration system. So long as the yarn is intact, it will prevent the sensing element from making resonance vibrations. But when the yarn breaks, the sensing element is free to make resonance vibrations which are detected by a vibration pickup device.

It is also known to detect breakage of the threads of a thread sheet by photoelectric means.

However, all of these methods are only suitable for detecting breakage of the continuous material. Other disturbances in the transport such as the continuous threadlike material getting caught or failure of the transport mechanism remain undetected.

The stop motion devices indicated as shown are also found inadequate if the thread, after it has broken, does not leave the path along which it travels when intact. In this regard it will be understood that it is not uncommon for a broken thread to remain under tension in that part of the path which is examined by the stop motion; consequently, breakage remains undetected.

Advantageously, these drawbacks are obviated by the method and apparatus according to this invention. Thus this invention contemplates a method of detecting disturbances in a moving continuous threadlike material, which comprises contacting a moving continuous threadlike material with a vibration pickup means, producing a varying output signal with the pickup means during movement of said material, examining the output signal for the magnitude of the variations occurring therein and detecting the presence of a disturbance in the transporting of the continuous material from the magnitude of the variations.

By the expression "examining the output signal for the magnitude of the variations occurring therein" it is to be understood that a disturbance in the transporting of the continuous material is indicated by a particular change in amplitude of these variations. For instance, if the movement of the continuous material unintentionally stops then there will be no variation in the output signal of the vibration pickup means. Also this variation will not be present in the case of any other transport disturbance that leads to an interruption of the movement of the continuous material. Since breakage of the continuous material is only one of the many different transport disturbances that can be detected by the application of the method according to this invention, it obviously offers a far wider scope of detection than the methods heretofore known.

This invention is also directed to an apparatus for detecting disturbances in the transporting of continuous threadlike material. This apparatus is characterized in that it comprises a vibration pickup means, in contact with the continuous threadlike material, for producing an output signal during vibration thereof; the pickup means, upon movement of the continuous material, emitting a varying output signal; and a device or monitoring means connected with the vibration pickup means, for indicating when a disturbance has occurred; said monitoring means responding to the magnitude of the variations in the output signal.

As a vibration pickup means, use could be made of a pneumatic pickup having an outlet opening through which air is passed and which is adapted to (or placed in contact with) the continuous material. Vibration of the moving continuous material will cause the outlet opening to be shut off to a varying extent, so that the measured pressure of the air passing through the opening will vary and will provide a varying output signal.

It is preferred, however, that use should be made of an apparatus which is characterized by the presence of a mechanoelectrical vibration pickup means which serves to convert the mechanical vibrations induced therein when the continuous material is in motion and in contact therewith into an alternating voltage, and a device or monitoring means which is connected to the vibration pickup means and which responds to the magnitude of the alternating voltage, for providing an indication when a disturbance occurs.

As a vibration pickup means, use may be made of any pickup device which, when brought into contact with the moving continuous material, and without giving rise to an inadmissable load, will vibrate and convert the generated vibration into a suitable output signal. It is, for instance, conceivable to use a sensing element which bears against the continuous material and to which a strain gauge is so attached that the resistance thereof will vary when the sensing element vibrates. Alternatively, use may be made of capacitive or inductive pickups by which vibrations are converted into changes of capacitance or inductance; also electrodynamic pickups may be used which convert a movement into a voltage.

It is particularly preferred, however, that use should be made of a piezoelectric pickup. Very suitable is a pickup means having a pickup element that consists of ceramic piezoelectric material. A piezoelectric pickup element has the advantage of being an active element since it directly converts a movement into a voltage. The use of piezoelectric pickup elements of ceramic material offers the advantages that they can be manufactured to have different shapes and dimensions, that they have sufficient mechanical strength to give a reasonably high output voltage, and that they are commercially available at a relatively low price.

Very suitable is a pickup element that is formed by a strip of ceramic piezoelectric material. It is preferred that the strip should at one end be clamped in a support of the vibration pickup means and at its opposite end be provided with a sensing element or means which is brought into contact with the continuous material.

In a different embodiment according to the invention the strip is supported at both ends, so that the nonsupported intermediate part of the strip serves as a guide for the continuous material.

Another different embodiment is characterized in that the strip is so supported that the continuous material only subjects it to a pressure load. This may be realized, for instance, by so supporting the strip on one of its sides, over its entire length or part thereof, so that the continuous material does not subject the strip to a bending load.

The invention also contemplates an apparatus, the pickup means of which consists of more than one pickup element. It is, for instance, possible to use two strips of piezoelectric material that are coupled in series and each clamped at one end by appropriate supports and whose free ends are mechanically interconnected by way of a sensing element.

The invention will be further described with reference to the accompanying drawings that show various embodiments of the apparatus in which:

FIG. 1 schematically shows the arrangement of the apparatus of the invention on an apparatus for the winding of thread;

Figure 3:
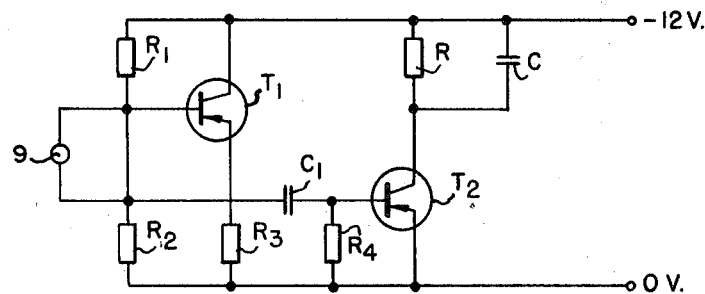
FIG. 3 shows one embodiment of an electronic circuit for handling the pickup signal generated by the pickup means.
Figure 4:
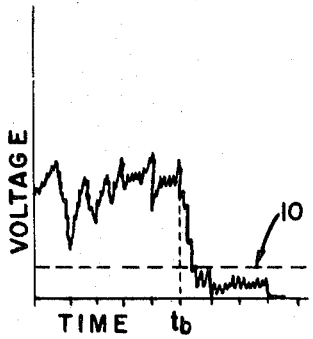
Figure 5:
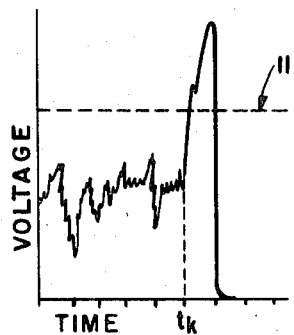
Figure 6:
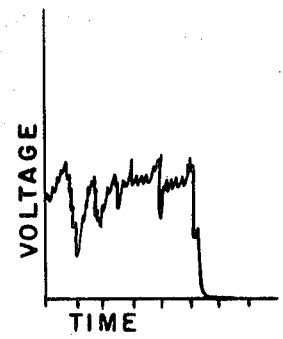

FIGS. 4, 5, and 6 show the variation in the output voltage of the circuit of FIG. 3 in three different monitoring situations; and FIGS. 7, 8, 9, and 10 show additional embodiments of the pickup means of the invention.

Figure 1:
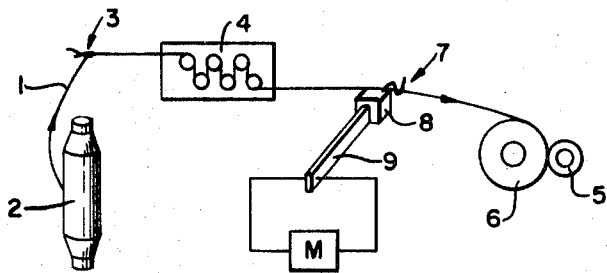

With the arrangement of the apparatus shown in FIG. 1 a textile thread 1 is drawn off from a supply package 2 and, via a thread guide 3, an adjustable thread tensioner 4 and a traverse drum 5, wound onto a bobbin 6. In the zone between the finger tensioner 4 and the traverse drum 5 the thread 1 comes into contact with a vibration pickup means which includes a sensing element or means which is constructed as a U-shaped thread guide 7. The thread guide 7 is connected with a metallic block 8, which is attached to the one end of a strip-shaped pickup element of ceramic piezoelectric material. The opposite end of the pickup element is clamped tight in a support of the pickup means (not shown) and is electrically connected to a monitoring means M responsive to the magnitude of the variations of the output signal of the pickup means for indicating when a disturbance has occurred. The left side and the right side of the strip 9 (as shown) form the electrodes of the pickup means in the circuit.

Figure 2:
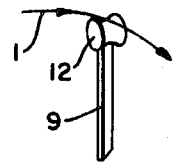
FIG. 2 represents a detail of a pickup means of the apparatus of the invention.

A different embodiment of the pickup means is shown in FIG. 2. In this case the upper end of the piezoelectric strip 9 is attached a cylindrical thread guide 12.

When the travelling thread 1 passes over the thread guide 7 or 12 the strip 9 will vibrate and emit an AC signal which is received by the monitoring means.

The operation of the apparatus of FIG. 1 may be further understood by the following examples.

By the application of a strip 2 cm. long and 4 mm. thick of a ceramic piezoelectric material which in a publication by Philips' Industrial Components and Material Division (July 1964—page 2) is referred to as PXE 5, the following results have been obtained (with arrangements illustrated in FIG. 1.)

EXAMPLE I

Upon the winding at a tension of 2 grams and a speed of 120 m./min. of a 15 denier monofilament yarn of polyepsilon-caprolactam, the pickup element emitted an alternating voltage of 0.1 v.

EXAMPLE II

With a similar yarn consisting of 10 filaments and having a total denier of 40, which was wound at a tension of 4 grams and at the same speed, the measured output voltage was 0.2 v.

EXAMPLE III

In an experiment with a yarn of polyethylene terephthalate consisting of 10 filaments and having a total denier of 45, which was wound at a tension of 4 grams and a speed of 120 m./min., the output voltage was 0.5 v.

In the aforementioned experiments the thread was always passed over the thread guide 7 at an angle of contact of approximately 15°, and the vibration frequency of the pickup element was 700 c.p.s. This frequency is found to be virtually independent of the yarn speed and yarn tension. Apparently, the pickup element is subject to a vibration having a frequency which is determined only by the nature and the dimensions of the element and the mass of the sensing element.

From the foregoing it will be recognized that the pickup element gives off a reasonably high voltage, so that the use of only a few transistors included in a simple amplifier circuits makes it possible to obtain a signal level that can serve many purposes. In this connection the use of an optical or acoustical indication and/or automatically switching off of the transport of the thread upon detection of a disturbance is possible.

By an appropriate choice of the resonance frequency of the pickup element it may be insured that frequency ranges in which interference signals may occur are practically avoided. Alternatively use may be made of selective amplification of the pickup signal.

It is possible that during the transport of the continuous threadlike material short disturbances occur that need not be detected. For instance, the sensing element of vibration pickup means may for a short time lose contact with the continuous material, so that the variation in the output signal of the vibration pickup means will decrease in magnitude, or on the other hand the signal variations may for a short time be greater than normal. If, in neither of these cases detection is desired, there may be introduced a second detection criterion wherein a minimum period for the duration of the change in the magnitude of the signal variation is established before the signal is detected. This can very suitably be realized with the aid of a rectifier circuit, which converts the variation in the output signal of the vibration pickup into a DC signal. A change in the amplitude of the variation of the pickup signal will then only lead to a corresponding change in the direct voltage level after the former change has lasted for a given period of time.

Favorable results have been obtained using a monitoring means including the transistor circuit shown in FIG. 3. This circuit comprises a transistor $T_1$ which is connected to the pickup element 9 and serves as an emitter follower, a transistor $T_2$ which serves to amplify the output signal of transistor $T_1$, and connected with the collector of $T_2$ a parallel circuit of a capacitor C with a resistor R. The remaining resistors $R_1$, $R_2$, $R_3$, and $R_4$ and the capacitor $C_1$ provide means for adjusting the circuit. If the output voltage of the pickup element is relatively high, which is the case, for instance, when the continuous material is formed by thick yarns wherein relatively high-tensile forces prevail, then the circuit shown in FIG. 3 may be simplified. In such cases, instead of two transistors, use is made of only one transistor, in the collector circuit of which the RC-circuit is provided.

By using the arrangement shown in FIG. 1 and the electronic circuit of FIG. 3, the following experimental results have been obtained.

FIGS. 4, 5, and 6 represent the output voltage of the electronic circuit across the resistor R as a function of time, for three different situations, the output voltage being plotted on the ordinate and the time on the abscissa.

The graph shown in FIG. 4 relates to a situation in which at the moment $t_b$ the thread breaks between the tensioner 4 and the sensing element of the vibration pickup means. It clearly shows that at this moment the output voltage of the circuit decreases rapidly and is ultimately reduced to zero when the thread no longer passes over the thread guide 7. It should be added that the horizontal dash line 10 indicates the discrimination level. As soon as the output voltage has decreased to below this discrimination level, indication of a disturbance takes place via the monitoring means.

FIG. 5 shows the situation in which in the zone between the supply package 2 and the pickup means the thread gets caught and finally breaks. It can be seen that when at the moment $t_k$ the thread gets caught, the output voltage rapidly increases to a certain value and subsequently sharply decreases. The introduction of a second and higher discrimination level 11 will insure that a disturbance is indicated also if the output voltage exceeds a predetermined maximum value. This indicates that in the situation shown in FIG. 5 the response to the thread getting caught is more rapid, and possibly takes place before the thread breaks. This is of particular advantage in the case of threads having a high elongation at break.

If in the zone between the pickup means and the winding apparatus the thread gets caught and also breaks, then the voltage curve is as shown in FIG. 6. As soon as the thread stops at the pickup means, the signal is no longer produced.

If the pickup means is located very near to the supply package 2 the thread will practically always break and get caught on the right-hand side of the pickup means so that the signal pattern shown in FIG. 6 will then prevail.

Although the aforedescribed embodiments relate to threads of relatively low denier, the application of the invention is in no way limited thereto. The above-indicated method may also be applied for checking the transport or movement of threads or yarns having a heavier denier. However, in that case it should be insured that the bending load applied to the ceramic pickup element is not great enough to cause breakage thereof. To prevent this, use may be made of, for instance, the embodiments of the pickup means shown in FIGS. 7 and 8.

Figure 7:
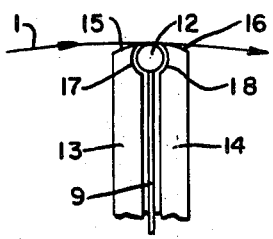

The embodiment of FIG. 7 includes a pickup element in the configuration shown in FIG. 2. On either side of the strip 9 there are provided small rigid bars 13, 14, which extend with their top ends 15, 16, respectively, to very near the thread 1. Near the thread guide 12, these bars have curved surfaces 17, 18. As soon as the deflection of the strip 9 exceeds a given value the thread guide 12 loses contact with the thread 1 which thereupon comes into contact with the top ends 15, 16 of the bars 13, 14. As a result, the strip 9 will return to the position in which it is in contact with the thread. This procedure is repeated, so that at heavier loads the strip 9 also will keep vibrating.

In cases where the continuous thread material deposits certain substances on the pickup means as a result of which the pickup element 9 might ultimately lose its freedom of movement between the bars 13 and 14, the space between the thread guide 12 and the curved surfaces 17, 18 may be filled with silicone rubber.

Figure 8:
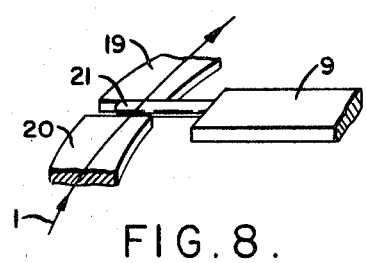

In the embodiment shown in FIG. 8 the pickup element 9 carries a rod-shaped sensing element 21 over which the thread is passed. The sensing element projects above the slightly curved upper surfaces of two strips 19, 20. Excessive deflection of the pickup element 9 is prevented in that the sensing element 21 will move downwards to below the upper surfaces of the strips 19, 20 which will thereupon take over the guiding of the thread, so that the pickup element 9 is relieved.

Figure 9:
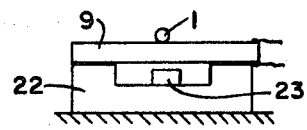

Alternatively, as is shown in FIG. 9, it is possible to support the piezoelectric strip at its two ends and to pass the yarn midway over the strip. In this embodiment the strip 9 is glued on an insulating support 22, and a stop 23 serves to prevent excessive deflection of the strip.

Figure 10:
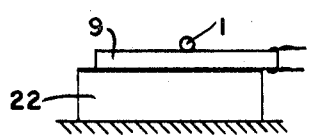

FIG. 10 shows an embodiment in which the flexural strength of the strip plays no role, i.e., has no consequence, because the strip is over its entire length glued on an insulating support 22'. Also in this case the thread 1 passes midway over the strip. The attendant decrease in the strength of the pickup signal may be compensated for by additional amplification in the monitoring means.

It will be appreciated that the method of this invention may also be used for detecting disturbances in the transport of a plurality of continuous materials that are processed simultaneously, as in the case in the warping of threads. The apparatus may then be constructed to indicate in which of the continuous materials a transport disturbance has occurred. To this end use may be made of, for instance, signalization by lamps or numerals, indicative of the material having the disturbance. To prevent stoppage of the transport mechanism from being followed by a simultaneous response of all the detection or monitoring apparatus there may be provided a blocking device. For instance, if during warping, breakage of one of the threads leads to the warping machine being switched off, the detection apparatus concerned may be caused to block all other detectors. The detectors may be deblocked when the warping machine is restarted. It will be clear that any one of the detection apparatus must be capable of blocking any other detector.

Obviously, the method and the apparatus according to the invention provide simple means of detecting transport disturbances. Also the method and the apparatus are suitable for detecting breakage, as well as undue stoppage of the transport, or movement of the thread irrespective of the cause. Moreover, it will be clear that as a result of the detection principle applied the pickup means may be located at any desired point of the transport zone. For, irrespective of the place where it occurs in the zone, the disturbance will also be detected at the pickup means. It will often be preferred that the pickup means should be located at the beginning of the zone.

It will be appreciated that the principle of piezoelectric conversion may also be applied in limit switches and positioning switches to obtain switching-on, switching-off or switching-over, as soon as some element has taken up a predetermined position. Moreover, it may be used for converting a voltage into a mechanical vibration, as takes place in a vibroscope, which is an apparatus for measuring the denier of fibers, which are vibrated therein.

It will also be appreciated that the indication of a transport disturbance obtained by this invention may be used to actuate a stop motion device, or to signal the need for a correction in the operation which does not require stoppage of the apparatus for transporting the continuous material.

We claim:

1. An apparatus for detecting transport disturbances in a moving continuous threadlike material which comprises a vibration pickup means in contact with a moving continuous threadlike material for emitting a varying output signal upon movement of the continuous material, said pickup means comprising a piezoelectric pickup element in the form of an elongated strip; support means operatively associated with said strip for preventing breakage of the strip by said continuous material, said support means insuring that the continuous material only subjects the strip to a predetermined pressure; and a monitoring means connected to said vibration means for determining when a transport disturbance has occurred in response to the magnitude of the variation in the output signal.

2. The apparatus of claim 1, in which said support means comprises guide means positioned adjacent to and below said elongated strip for guiding the continuous material in contact with said strip and for reducing the pressure exerted by said material on said strip.

3. The apparatus of claim 1, in which said support means comprises an insulating support member adhesively sealed to the entire length of one side of said strip, said continuous material contacting said strip on its other side.

4. The apparatus of claim 1, in which said strip is supported at both ends by an insulating support, one side of the intermediate nonsupported portion the strip acting as a guide for said continuous material and said support means including a stop element positioned close to the other side of said strip to prevent excessive deflection of the strip due to pressure exerted by said continuous material.

5. The apparatus of claim 1 in which said vibration pickup means converts the mechanical vibrations induced therein when the continuous material is in motion into an alternating voltage and said monitoring means responds to the magnitude of the alternating voltage.

6. The apparatus of claim 1 in which the pickup element is made of a ceramic piezoelectric material.

7. The apparatus of claim 1 in which said vibration pickup means further comprises a sensing means in contact with the continuous material for transmitting vibrations to said piezoelectric strip.

8. The apparatus of claim 7 in which said strip is fixed at one end and the other end is provided with said sensing means.